(12) United States Patent
Ramsteiner et al.

(10) Patent No.: US 12,253,604 B2
(45) Date of Patent: Mar. 18, 2025

(54) LIDAR SYSTEM INCLUDING HOLOGRAPHIC IMAGING OPTICS (71) Applicant: Robert Bosch GmbH, Stuttgart (DE)

(72) Inventors: Ingo Ramsteiner, Leonberg (DE); Reinhold Fiess, Durbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 878 days.

(21) Appl. No.: 17/420,515

(22) PCT Filed: Feb. 26, 2020

(86) PCT No.: PCT/EP2020/054980
§ 371 (c)(1),
(2) Date: Jul. 2, 2021

(87) PCT Pub. No.: WO2020/187537
PCT Pub. Date: Sep. 24, 2020

(65) Prior Publication Data
US 2021/0389464 A1 Dec. 16, 2021

(30) Foreign Application Priority Data

Mar. 18, 2019 (DE) ............ 10 2019 203 640.6

(51) Int. Cl.
*G01S 17/89* (2020.01)
*G01S 7/481* (2006.01)
(Continued)

(52) U.S. Cl.
CPC ............ *G01S 17/89* (2013.01); *G01S 7/4815* (2013.01); *G01S 7/4816* (2013.01);
(Continued)

(58) Field of Classification Search
None
See application file for complete search history.

(56) References Cited

U.S. PATENT DOCUMENTS

| 7,104,453 B1* | 9/2006 | Zhu | G01S 17/88 |
| | | | 235/462.07 |
| 2007/0177841 A1 | 8/2007 | Danziger | |
| 2018/0348344 A1 | 12/2018 | Wyrwas et al. | |

FOREIGN PATENT DOCUMENTS

| CN | 104597436 A | 5/2015 |
| CN | 109116328 A | 1/2019 |

(Continued)

OTHER PUBLICATIONS

International Search Report for PCT/EP2020/054980, Issued Apr. 20, 2020.

*Primary Examiner* — Eric L Bolda
(74) *Attorney, Agent, or Firm* — NORTON ROSE FULBRIGHT US LLP; Gerard A. Messina (57) ABSTRACT A LIDAR system for detecting objects within an observation area. The LIDAR system includes an illumination unit for illuminating the observation area using multiple light radiations, each having a different wavelength, multiple separate spatial areas of the observation area, which are presently detected by a detection area of the LIDAR system, being temporally consecutively illuminated in each case with another of the light radiations; and a detection unit for detecting the light radiations reflected by objects, including at least one detection array, which is individually assigned to the particular detection area and is made of up of a detector for detecting the light radiations from the spatial areas presently detected by the detection area, and a holographic imaging optics for focusing the respective light radiations onto the detector.

11 Claims, 4 Drawing Sheets (51) Int. Cl.
  *G02B 5/32*    (2006.01)
  *G03H 1/02*    (2006.01)
(52) U.S. Cl.
  CPC .............. *G01S 7/4817* (2013.01); *G02B 5/32* (2013.01); *G03H 1/0248* (2013.01)

(56) References Cited

FOREIGN PATENT DOCUMENTS

| | | |
|---|---|---|
| DE | 102007022247 A1 | 11/2007 |
| DE | 102017201127 A1 | 7/2018 |
| EP | 1813964 A2 | 8/2007 |
| JP | 108166454 A | 6/1996 |
| JP | 2001291266 A | 10/2001 |
| JP | 2009103529 A | 5/2009 |
| JP | 2018105685 A | 7/2018 |
| WO | 11146523 A2 | 11/2011 |
| WO | 2018215407 A1 | 11/2018 |
| WO | 2019017245 A1 | 1/2019 |

\* cited by examiner

LIDAR SYSTEM INCLUDING HOLOGRAPHIC IMAGING OPTICS

FIELD

The present invention relates to a LIDAR system including a holographic imaging optics. The present invention furthermore relates to a holographic imaging optics for such a LIDAR system.

BACKGROUND INFORMATION

LIDAR systems are used for ascertaining 3D data of an observation area. Such a system includes at least one photoemitter for generating light radiation of certain wavelengths, which is typically designed in the form of a laser, and at least one detector for detecting light radiation of the respective wavelengths. During operation of the system, the light radiation which is emitted by the emitter and reflected or scattered on objects in the observation area is detected by the detector. By measuring the runtimes of the light radiation reflected on the scanned objects, it is possible to calculate the distance of the particular objects. Typical LIDAR systems carry out a plurality of individual measurements in the observation area, during each of which only a small spatial area or solid angle is detected. The entirety of the individual measurements then results in a 3D point cloud, which allows conclusions to be drawn on the spatial distribution of the objects in the particular observation area. For example, PCT Patent Application No. WO 11146523 A2 describes a corresponding LIDAR system in which multiple photoemitters, together with the same number of detectors, are situated on a shared rotating platform. In the process, each photoemitter is assigned a respective detector, an optical device made up of lenses and mirrors ensuring that each detector observes the solid angle at which the associated photoemitter emits. In this configuration, each emitter/detector pair forms a separate laser distance measuring device, each individual emitter/detector pair looking in a different direction, based on the rotation axis of the entire device. A rotary motion of the system then allows the 3D point cloud to be scanned, each individual emitter/detector pair scanning a different plane of the observation area.

To achieve detection ranges as large as possible, the imaging optics in LIDAR systems is typically designed in such a way that it sees as little ambient light as possible. Otherwise, the laser light reflected by an object would be difficult to distinguish from the background radiation, in particular, in the case of direct solar radiation. This is achieved by a spectral selection, in which the incoming light is filtered, for example with the aid of bandpass filters, a temporal selection, during which the detection occurs in a narrow time window, and a geometric selection, in which only a narrow field of vision around the emitted beam is observed. In particular, the geometric selection, however, makes it necessary for each scanning plane to require a dedicated detector in the case of the conventional optics design. Only in this way is it possible to achieve that each detector sees only a very narrow angular range. However, the plurality of detectors necessary for this purpose has the disadvantage that in this way the complexity and the costs of the system are considerably increased.

SUMMARY

It is an object of the present invention to reduce the number of detectors necessary for detecting the 3D point cloud. This object may be achieved by a LIDAR system in accordance with an example embodiment of the present invention. Further advantageous specific embodiments of the present invention are disclosed herein.

According to the present invention, a LIDAR system for detecting objects within an observation area is provided. In accordance with an example embodiment of the present invention, the LIDAR system includes an illumination unit for illuminating the observation area using multiple light radiations, each having a different wavelength, multiple separate spatial areas of the observation area, which are presently detected by a detection area of the LIDAR system, being temporally consecutively illuminated using a different light radiation in each case. The LIDAR system furthermore includes a detection unit for detecting the light radiations reflected by objects in the observation area, including at least one detection array, which is individually assigned to the particular detection area, made of up of a detector for detecting the light radiations from the spatial areas presently detected by the detection area, and a holographic imaging optics for focusing the respective light radiations onto the detector. In the process, the holographic optical element is designed, for each of the light radiations focused onto the detector, to focus the respective light radiation from only one spatial area individually assigned to the particular light radiation and presently detected by the detection area onto the detector. The holographic imaging optics makes it possible to address two or multiple scanning planes in each case using only one detector, and to nonetheless narrow the field of view during each measuring process to only one of the viewing directions thus combined. Compared to a conventional scanning LIDAR system, it is thus possible with the aid of the system provided here to scan the same number of scanning planes using a lower number of detectors. The lower number of detectors enables a considerably less complex configuration. Furthermore, the lower number of detectors is also associated with a reduction in the manufacturing costs of such a LIDAR system. This is, in particular, of advantage when, due to the wavelengths used, it is not possible to use silicon-based detector elements, but the considerably more expensive InGaAs detectors are required, for example. As an alternative to using a lower number of detectors, it is also possible to scan a larger number of scanning planes with the aid of the same number of detectors. In this way, the vertical resolution of the LIDAR system may be increased.

In one specific embodiment of the present invention, it is provided that the holographic imaging optics includes at least one holographic optical element. In the process, according to the present invention a regular imaging optics is replaced or supplemented with a holographic imaging optics made up of one or multiple holographic optical element(s). In contrast to a traditional refractive optics, the holographic optical elements only work well for a certain wavelength and spatial direction and only have a very limited tolerance with respect to this property. The use of the holographic imaging optics in a LIDAR system thus has the advantage that neither light from other spatial directions, nor light having wavelengths other than those intended, is guided onto the detector. Since the holographic imaging optics, due to its wavelength selectivity, intrinsically represents a bandpass filter, a separate bandpass filter may ideally be dispensed with, which is required with conventional LIDAR systems.

In one further specific embodiment of the present invention, it is provided that the holographic optical element includes multiple holograms, which are designed to focus one of the light radiations from a respective other of the spatial areas presently detected by the particular detection area onto the detector. The use of multiple holograms allows particularly simple and cost-effective manufacture of the holographic optical element. Furthermore, the wavelength selectivity of the holographic optical element also improves as a result of the use of multiple holograms.

In one further specific embodiment of the present invention, it is provided that at least one of the holograms is designed in the form of a transmission geometry volume hologram. This design enables a particularly simple and cost-effective configuration.

In one further specific embodiment of the present invention, it is provided that the illumination unit includes a photoemitter array including multiple photoemitters, which each emit one of the light radiations. This array makes it possible to generate the different light radiations independently of one another.

In one further specific embodiment of the present invention, it is provided that a passive optics made up of at least one diffractive optical element and/or a holographic optical element is assigned in each case to the individual photoemitters. In the process, the passive optics is designed to split the light radiation emitted by the respective photoemitter into at least two subbeams, each illuminating a different spatial area of the observation area. Such a passive optics thus makes it possible, with the aid of individual photoemitters, to simultaneously illuminate multiple spatial areas, which are each assigned to different detection areas. In this way, the number of photoemitters used may be reduced, and thus the complexity and the costs of manufacturing such an illumination unit may be reduced.

In one further specific embodiment of the present invention, it is provided that the detection unit includes multiple detection arrays which are situated spatially offset from one another and are each made up of a detector and a holographic optical element individually assigned to the detection arrays. In the process, the detection areas of the detection arrays each detect different spatial areas of the observation areas. In this way, a relatively large field of view is formed, which allows the LIDAR system to rapidly detect the entire observation area.

In one further specific embodiment of the present invention, it is provided that the detection arrays of the detection unit are situated in a focal plane of a shared imaging optics. Such an imaging optics increases the equipment of the optical imaging system. In this way, it becomes possible to map a larger portion of the light radiation incident on the imaging optics from a certain spatial direction onto the detection array which is assigned to the particular light radiation or the particular spatial direction. As a result of the thus overall increased luminous intensity of the light beams to be detected, the signal-to-noise ratio, and thus the measuring accuracy of the detector, also improve.

In one further specific embodiment of the present invention, it is provided that all spatial areas of the observation area which are presently detected by detectors of the detection unit define a present field of view of the LIDAR system. The LIDAR system is designed in the process to scan the entire observation area with the aid of a scanning movement of the present field of view along a predefined scanning direction. As a result of the scanning movement, it is possible to scan a relatively large observation area with the aid of a relatively small number of detectors. In this way, the LIDAR system may be manufactured with less complexity and considerably more cost-effectively.

In one further specific embodiment of the present invention, it is provided that at least one detection array is assigned an optical bandpass filter, which only allows the light radiation which is individually assigned to the particular detection array to pass. With the aid of the bandpass filter, the wavelength selectivity of the holographic imaging optics may be increased, which is, in particular, accompanied by a considerably better signal-to-noise ratio.

Furthermore, a holographic imaging optics for a LIDAR system, encompassing a holographic optical element including multiple holograms, is provided. The holograms are each designed in the process to focus a light radiation, which is individually assigned to the particular hologram, from a respective spatial area which is individually assigned to the particular light radiation onto a detector which is individually assigned to the particular holographic optical element.

Example embodiments of the present invention are described in greater detail hereafter based on figures.

DETAILED DESCRIPTION OF EXAMPLE EMBODIMENTS

Figure 1:
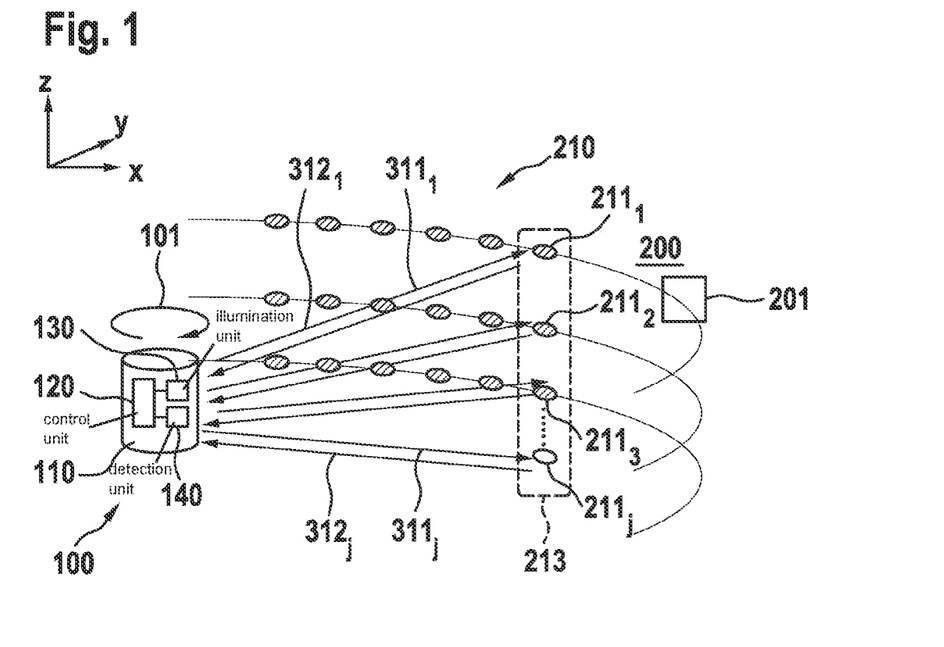
FIG. 1 shows a scanning LIDAR system while scanning an observation area.

FIG. 1 schematically illustrates the principle of a scanning LIDAR system 100, which scans a defined observation area 210 of its immediate surroundings 200 with the aid of light beams $311_j$. LIDAR system 100 includes an illumination unit 130, which is situated in a rotating housing 110 and includes multiple photoemitters for generating one or multiple light radiation(s), which is/are emitted in the form of separate light or laser beams $311_j$ into different spatial directions. In the process, each of light beams $311_j$ illuminates a spatial area $211_j$ which is individually assigned to the particular light beam $311_j$, in the present example spatial areas $211_j$ detected simultaneously by illumination unit 130 at a certain point in time being situated vertically beneath one another, so that the present field of view 213 of LIDAR system 100 forms a more or less coherent strip. Housing 110 and illumination unit 130 situated therein are pivoted along a predefined scanning direction by a scanning movement 101 so that, during an entire scanning period, field of view 213 detects all spatial areas $211_j$ of the present observation area 210 of LIDAR system 100.

During the measuring process, light beams $311_j$ emitted by LIDAR system 100 strike objects 201 in surroundings 200 and are reflected by them to LIDAR system 100, where they are detected with the aid of a detection unit 140. Based on the runtimes of the received light beams $312_j$, a control unit 120 of LIDAR system 100 ascertains the distance from object 201 illuminated by the particular light beam for each of these light beams $311_j$, $312_j$. After an entire scanning period, LIDAR system 100 supplies a point cloud as the measuring result, which represents the relative arrangement of objects 201 within observation area 210 of LIDAR system 100.

Figure 2:
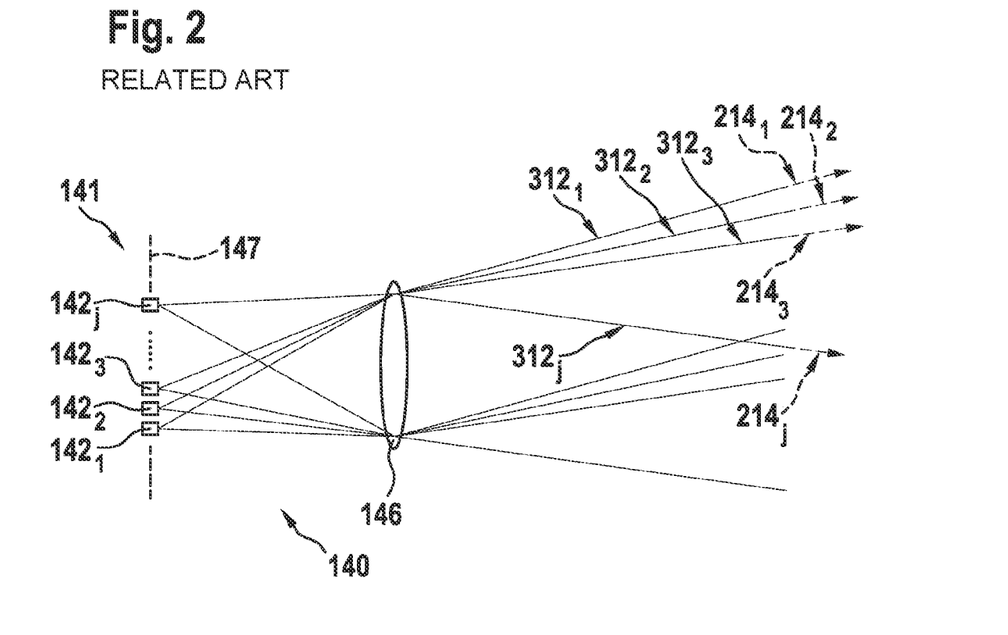
FIG. 2 schematically shows a detection unit of a conventional LIDAR system.

The detection of light beams $312_j$ reflected from the different spatial areas $211_j$ of the present field of view 213 takes place individually in the process. In the case of a conventional LIDAR system 100, a dedicated detector $142_j$ is thus in each case individually assigned to each viewing angle. In this regard, FIG. 2 shows a corresponding detailed view of a typical detection unit 140 of a conventional LIDAR system 100. Detection unit 140 includes an imaging optics 146 and a group 141 of detectors $142_1$-$142_m$, which are situated in a column-shaped manner beneath one another in a focal plane 147 of imaging optics 146. In the process, imaging optics 146 focuses light from different spatial directions onto different spots in its focal plane 147, each of light beams $312_j$ reflected from one of spatial areas $211_1$-$211_j$ of the present field of view 213 being mapped onto a detector $142_1$-$142_j$ individually assigned to the particular spatial area $211_1$-$211_j$. LIDAR system 100 thus has a total number of j viewing directions $214_j$.

LIDAR system 100 uses avalanche diodes (APDs) or single-photon avalanche diode (SPADs) as detectors $142_1$-$142_j$. In the process, the diodes may be present in isolated instances or as part of a monolithic array. Furthermore, it may also be advantageous to interconnect an entire array or a portion of an array of SPADs into an individual detector ("solid-state photomultiplier"). Depending on the application, imaging optics 146 shown symbolically here as an individual lens may be made up of an individual optical component, such as for example a lens or a concave mirror, or of an array of multiple such components, such as for example a lens triplet and an inverting mirror.

Figure 3:
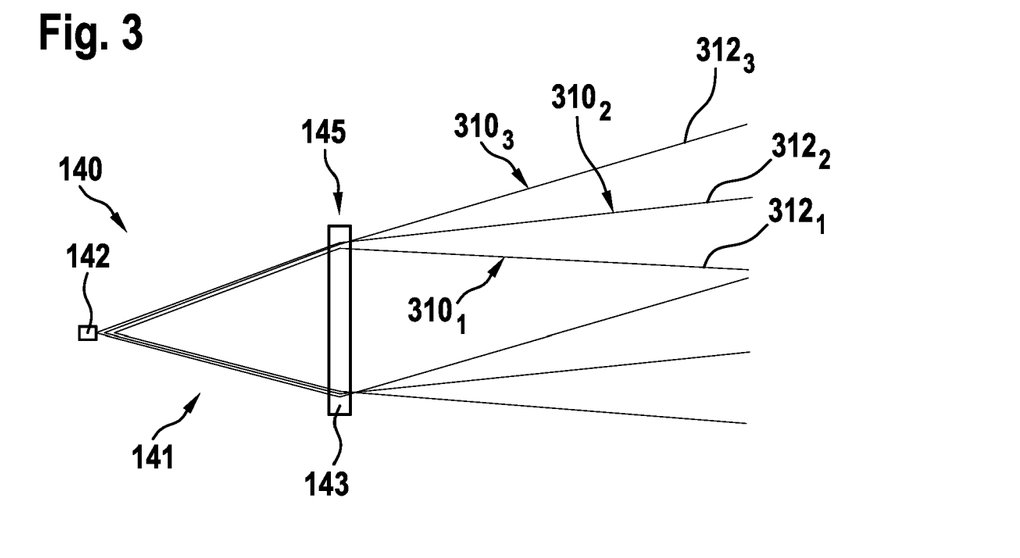
FIG. 3 schematically shows a detection unit of a LIDAR system including a holographic imaging optics made up of a holographic optical element, in accordance with an example embodiment of the present invention.

To be able to reduce the number of detectors in such a scanning LIDAR system, with the same resolution, according to the present invention the conventional imaging optics based on lenses and/or mirrors is replaced or supplemented with a holographic imaging optics 145 including holographic elements, which generates multiple viewing directions for each of the m detectors $142_1$-$142_j$. For this purpose, FIG. 3 schematically shows a detection array 141 of an accordingly modified detection unit 140 of LIDAR system 100, including a detector 142 and a holographic imaging optics 145 including a holographic optical element 143 assigned to detector 142. Holographic optical element 143 formed of holograms is designed to focus multiple light radiations $310_1$-$310_3$, each having different wavelengths, from different directions onto detector 142. A total of three different light radiations $310_1$-$310_3$ are shown in the present example, which strike in the form of reflected light beams $312_1$-$312_3$, each from different spatial directions, and are mapped onto detector 142 by holographic optical element 143. In contrast to a traditional refractive optics, it is a fundamental property of holograms to only work well for certain wavelengths and spatial directions, and to have only a limited tolerance with respect to this property. The use of holograms for the application in a LIDAR system thus has the advantage that neither light from spatial directions other than those intended, nor light having wavelengths other than those intended, is guided onto detector 142. Due to this wavelength selectivity, for example an additional bandpass filter is ideally not required, however may nonetheless be advantageous, depending on the application.

Figure 4:
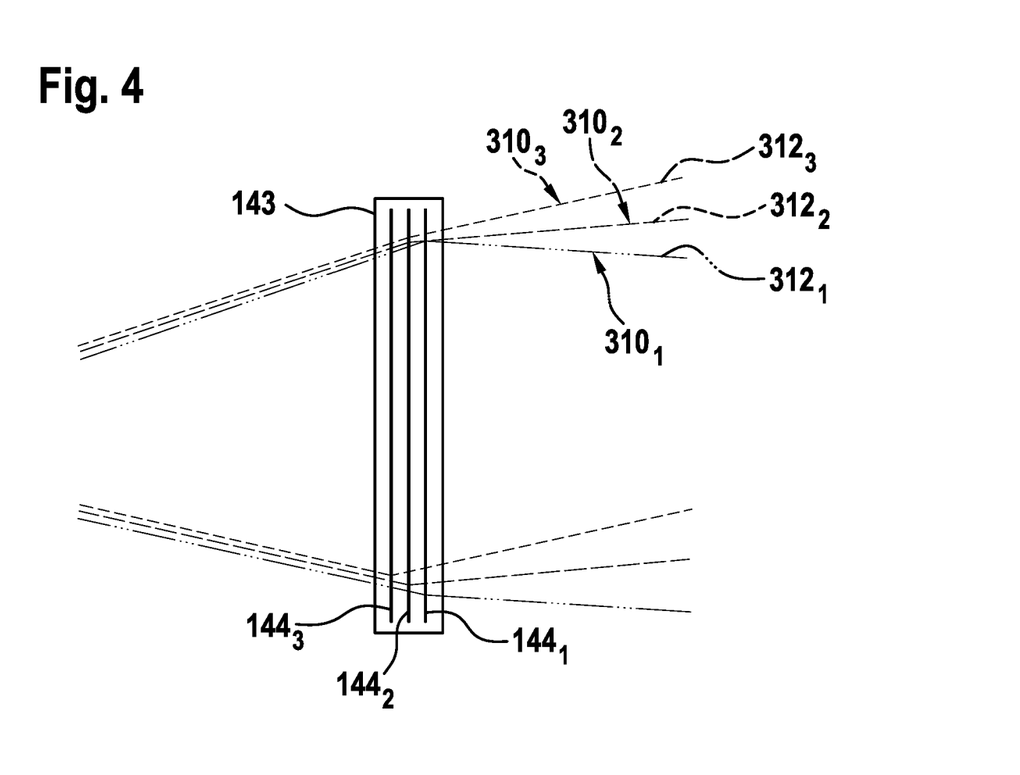
FIG. 4 shows a detailed view of the holographic optical element including multiple holograms from FIG. 3, in accordance with an example embodiment of the present invention.

Holographic optics 145 is made up of at least one holographic optical element 143, which includes n holograms $144_1$-$144_n$, n≥2 applying. Each of these n holograms $144_1$-$144_n$ is characterized in that it focuses a certain bundle of rays onto detector 142 for a corresponding number of n wavelengths $\lambda_1$-$\lambda_n$. Formulated in the wave representation, an ideally flat wave from a certain spatial direction is converted into a spherical wave front in the case of a hologram, which is centered on the detector position. In the present exemplary embodiment, a total of three light radiations $310_1$, $310_2$, $310_3$, which each have a different wavelength and which are reflected onto detector array 141 in the form of three light beams $312_1$, $312_2$, $312_3$ from different spatial areas, are mapped onto the shared detector 142 by holographic optical element 143. FIG. 4 shows a detailed view of holographic optical element 143 from FIG. 3. In the process, it becomes apparent that holographic optical element 143 is made up of a total of three consecutively situated holograms $144_1$, $144_2$, $144_3$, which each map a light radiation $310_1$, $310_2$, $310_3$ which is individually assigned to the respective hologram, from a spatial direction individually assigned to the particular light radiation $310_1$, $310_2$, $310_3$, onto detector 142. Holographic optical element 143, including its three holograms $144_1$, $144_2$, $144_3$, thus generates a total of three viewing directions in the present exemplary embodiment for the assigned detector 142. In the process, the number of viewing directions thus generated may be adapted as needed in each particular case by providing a corresponding number of holograms. In particular, additional viewing directions may be implemented relatively easily by adding further holograms to holographic optical element 143.

However, it may be useful to limit the number of holograms combined in a holographic optical element 143 since each additional hologram is generally also accompanied by a deterioration of the optical properties of holographic optical element 143. For example, the efficiency with which the individual holograms focus light having the corresponding wavelength as desired decreases as a result of the multiplexing of multiple holograms. At the same time, diffuse scattering increases, so that light radiation having undesirable wavelengths λ also reaches the detector. The involved deterioration of the signal-to-background ratio may, in particular, prove to be particularly critical in LIDAR applications.

Figure 5:
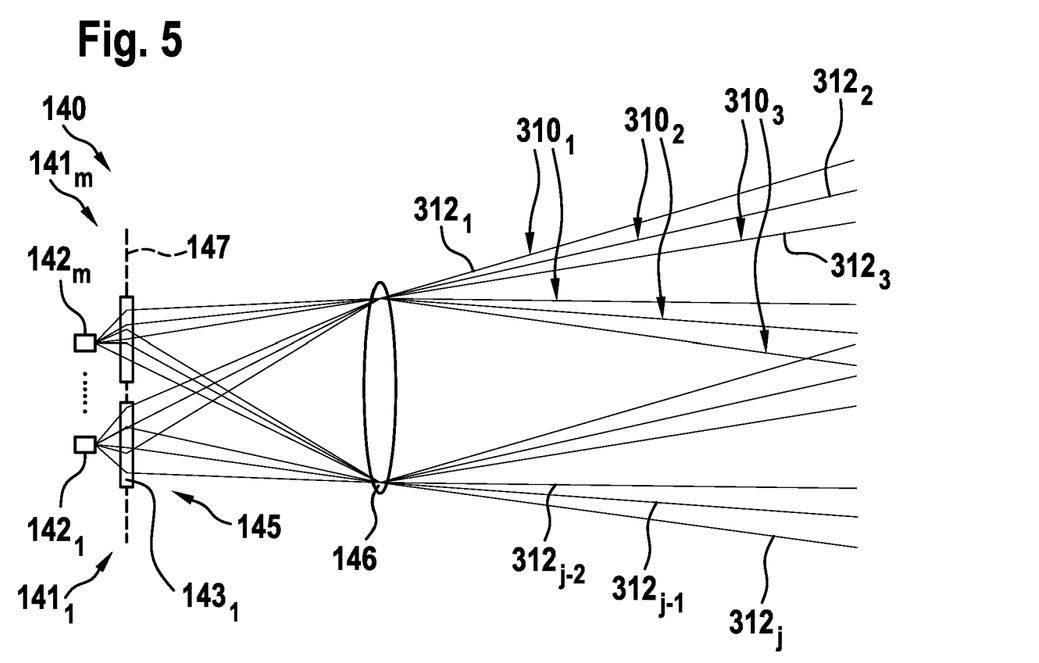
FIG. 5 schematically shows an expanded detection unit including multiple detection arrays according to FIG. 3 and a shared imaging optics, in accordance with an example embodiment of the present invention.

To be able to increase the number of the viewing directions of the LIDAR system without these disadvantages, an array is selected in which the different viewing directions are distributed among multiple detectors, each equipped with a dedicated holographic optical element. For this purpose, FIG. 5 shows a corresponding detection unit 140 including a group of in total m detection arrays $141_1$-$141_m$, made up in each case of a detector $142_1$-$142_m$ and a holographic optical element $143_1$-$143_m$ individually assigned to the detection arrays. Detection arrays $141_1$-$141_m$ situated in a row-shaped manner beneath one another each have different viewing directions. In the process, each detection array $141_1$-$141_m$ includes a holographic optical element $143_1$-$143_m$, which, in turn, includes n holograms $144_1$-$144_n$ for wavelengths $\lambda_1$-$\lambda_n$, and thus has n different viewing directions. The entire group of detection arrays $141_1$-$141_n$ thus includes a total of j holograms, and thus viewing directions, j=m*n applying. The group having in each case m=3 holograms or viewing directions per detection array $141_1$-$141_n$ shown in FIG. 5 thus has a total of m*3 viewing directions. Even though the embodiment shown in FIG. 5 includes more detectors compared to the individual holographic optical element from FIG. 4 having n holograms or viewing directions, it has the advantage that the lower number of holograms per holographic optical element results in better optical quality. Furthermore, each of wavelengths $\lambda_1$-$\lambda_n$ may be used for a total of m paths or viewing directions since only a single viewing direction is assigned to each of the m detection arrays $141_1$-$141_n$ for each wavelength $\lambda_1$-$\lambda_n$, and thus up to m individual measurements may take place simultaneously.

To increase the light efficiency, in the present exemplary embodiment all optical paths of detection unit 140 are collected by a conventional imaging optics 146 and only distributed downstream therefrom among the individual detection arrays $141_1$-$141_n$, which are situated in a focal plane 147 of the shared imaging optics 146. In principle, however, it is also possible to situate detection arrays $141_1$-$141_n$ next to one another even without the shared traditional imaging optics 146. However, the equipment is thus made smaller, which is rather disadvantageous in a LIDAR system. With the aid of the traditional imaging optics 146 shown in FIG. 5, in contrast, it is possible to collect as much light as possible, and to distribute it among the individual holographic optical elements only thereafter.

Figure 6:
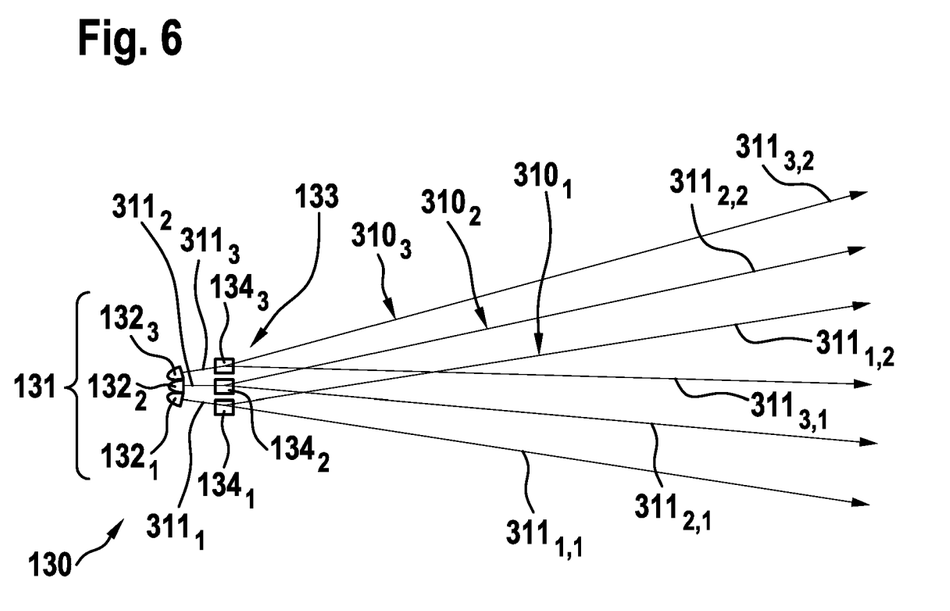
FIG. 6 shows an illumination unit of the LIDAR system including a diffractive optics made up of multiple diffractive optical elements, in accordance with an example embodiment of the present invention.

For the implementation of the total of j viewing directions, a corresponding number of separate light paths or light beams is required. These may be implemented, for example, by a corresponding number (j) of photoemitters. Since the individual detection arrays $141_1$-$141_n$ carry out measurements independently of one another in the embodiment variant shown in FIG. 5, it is useful to use in each case the same light radiations or wavelengths for all detection arrays $141_1$-$141_n$. Since, in this case, a total of n viewing directions or spatial areas are simultaneously excited or illuminated with the same light radiation or wavelength, it is possible to use only n photoemitters, whose emitted light beams are split by passive optics. In this regard, FIG. 6 shows an accordingly designed illumination unit 130 of LIDAR system 100. Illumination unit 130 includes a photoemitter system 131 including a total of i individual photoemitters $132_1$-$132_i$, each emitting a light radiation $310_1$-$310_i$ having a different wavelength $\lambda_1$-$\lambda_i$ in the form of a light beam $311_1$-$311_i$, in the present exemplary embodiment only three individual photoemitters $132_1$, $132_2$, $132_3$ being shown. Each of photoemitters $132_1$-$132_i$ is assigned a respective passive optics $134_1$-$134_i$ in the form of a diffractive optical element (DOE), which splits light beam $311_1$-$311_i$ of the respective photoemitter $132_1$-$132_i$ into two or multiple individual subbeams $311_{i,1}$-$311_{i,2}$, which are emitted in the different spatial directions in each case. As an alternative to the use of the total of n DOEs as passive optics $134_1$-$134_i$, it is generally also possible to use one or multiple holographic optical element(s) for this purpose (not shown here).

Figure 7:
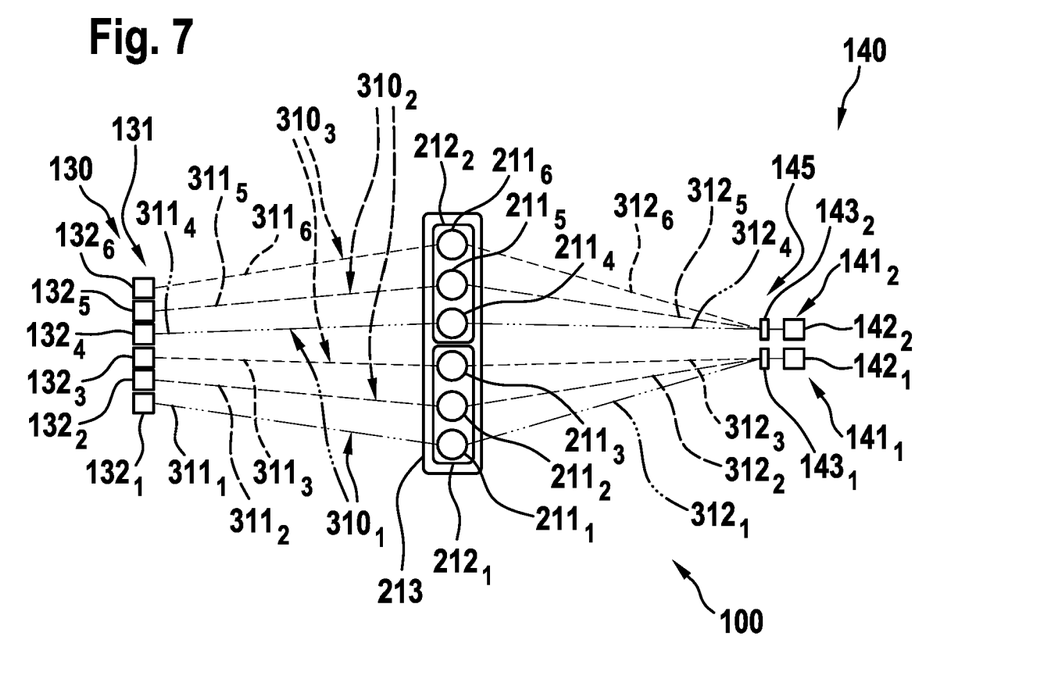
FIG. 7 schematically shows the configuration of a LIDAR system including a reduced number of detection arrays, in accordance with an example embodiment of the present invention.

FIG. 7 shows a schematic representation of a LIDAR system 100 according to the variant from FIG. 5, including an illumination unit 130 including a photoemitter array 131 made up of a total of six photoemitters $132_1$-$132_6$, and a detection unit 140 including a total of two detection arrays $141_1$, $141_2$. For the sake of clarity, illumination unit 130 and detection unit 140 of LIDAR system 100 were shown on opposite sides of observation area 110. In the case of a typical LIDAR system 100, these units are situated in a shared housing so that the light paths of the transmission and reception light beams $311_1$-$311_6$, $312_1$-$312_6$ essentially extend next to one another. Observation area 210, which is only hinted at here, in general encompasses a plurality of separate spatial areas, for the sake of clarity only six spatial areas $211_1$-$211_6$ being shown, which are presently detected by detection areas $212_1$, $212_2$ of the two detection arrays $141_1$, $141_2$. The first three photoemitters $132_1$-$132_3$ of photoemitter system 131 consecutively illuminate the first three of spatial areas $211_1$-$211_3$ with their respective separately generated transmission light beams $311_1$-$311_3$. In parallel thereto, the remaining three photoemitters $132_4$-$132_6$ of photoemitter array 131 consecutively illuminate the remaining three spatial areas $211_4$-$211_6$ with their respective separately generated transmission light beams $311_4$-$311_6$. During a regular operation of LIDAR system 100, a respective spatial area $211_1$-$211_6$ from each of detection areas $212_1$, $212_2$ is thus illuminated, at any arbitrary measuring point in time, with light radiation $310_1$-$310_k$ individually assigned to the particular spatial area $211_1$-$211_6$. On the reception side, the light radiations reflected or scattered from the presently illuminated spatial areas $211_1$-$211_6$ in the form of reception light beams $312_1$-$312_6$ back to reception unit 140 are received by the two detection arrays $141_1$, $141_2$. In the process, holographic optical elements $143_1$, $143_2$ situated in each case upstream of detectors $142_1$, $142_2$ cause each detector $142_1$, $142_2$ to only receive light radiations $310_1$-$310_k$ which are individually assigned to this detector $142_1$, $142_2$ from only one spatial area $211_1$-$211_6$ which is individually assigned to the particular detector $142_1$, $142_2$.

Figure 8:
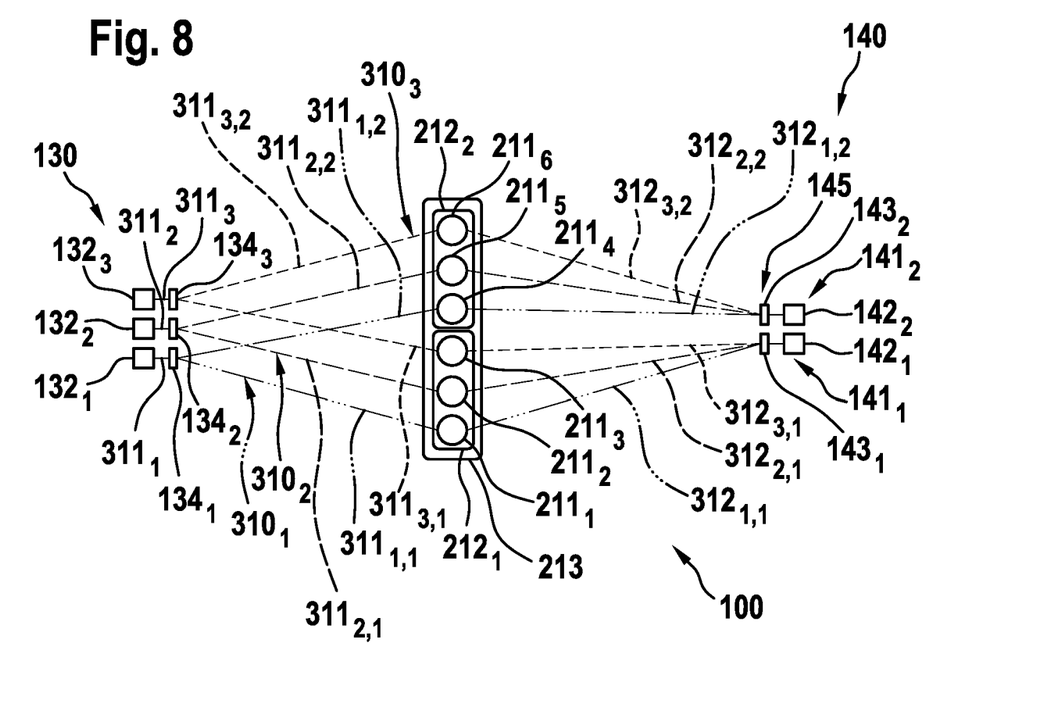
FIG. 8 schematically shows a modification of the system from FIG. 7 in which the number of photoemitters of the LIDAR system was reduced with the aid of multiple diffractive optical elements, in accordance with an example embodiment of the present invention.

Since the measurements for each of detection areas $212_1$, $212_2$ occur independently of one another, light radiations $310_1$-$310_k$ having the same wavelengths $\lambda_1$-$\lambda_k$ may be used for all detection areas $211_1$, $211_2$. As is indicated in FIG. 7 with the aid of differently dotted lines, the total of six spatial areas $211_1$-$211_6$ of the two detection areas $211_1$, $211_2$ are thus only illuminated with three different light radiations $310_1$, $310_2$, $310_3$. As is illustrated in FIG. 8, the number of photoemitters $132_1$-$132_1$ of illumination unit 130 may thus be reduced to a total of three. For this purpose, LIDAR system 100 includes illumination unit 130 shown in FIG. 6, in which a respective passive optics $134_1$, $134_2$, $134_3$ is connected downstream from each photoemitter $132_1$, $132_2$, $132_3$ as a beam splitter. Each of passive optics $134_1$, $134_2$, $134_3$, for example in the form of a diffractive optical element (DOE), in each case splits light beam $311_1$, $311_2$, $311_3$ generated by the particular photoemitter $132_1$, $132_2$, $132_3$ into two subbeams $311_{1,1}$, $311_{1,2}$, $311_{2,1}$, $311_{2,2}$, $311_{3,1}$, $311_{3,2}$, which in each case scan a spatial area $211_1$-$211_6$ in different detection areas $211_1$, $211_2$.

Holograms $144_1$, $144_2$, $144_3$ used in the above-described exemplary embodiments are preferably transmission geometry volume holograms. This embodiment is advantageous since in this way greater efficiencies are possible. However, a corresponding holographic optics may also be implemented with the aid of other types of holograms, for example with the aid of reflection holograms.

In the above description, the term "reflected light radiation" shall be understood to mean the light radiation reflected by the objects in the surroundings of the LIDAR system in the direction of the detection unit by reflection, diffuse reflection or scattering.

Although the present invention was illustrated and described in detail by the preferred exemplary embodiments, the present invention is not limited by the described examples. Rather, other variations may be derived therefrom by those skilled in the art without departing from the scope of protection of the present invention, in view of the disclosure herein.

The invention claimed is:

1. A LIDAR system for detecting objects within an observation area, comprising:
   an illumination unit configured to illuminate the observation area using multiple light radiations, each having a different wavelength and being emitted in the form of light beams, multiple separate spatial areas of the observation area, which are presently covered by a detection area of the LIDAR system, being temporally consecutively illuminated in each case with another of the light radiations; and
   a detection unit configured to detect the light radiations reflected by objects in the observation area, including at least one detection array, which is individually assigned to the particular detection area and is made of up of a detector configured to detect the light radiations from the spatial areas presently covered by the detection area and a holographic imaging optics configured to focus the respective light radiations onto the detector, the holographic imaging optics being configured, for each of the light radiations which are focused onto the detector, to focus a particular light radiation of the light radiations from only one spatial area, which is individually assigned to the particular light radiation and presently covered by the detection area, onto the detector.

2. The LIDAR system as recited in claim 1, wherein the holographic imaging optics includes at least one holographic optical element.

3. The LIDAR system as recited in claim 2, wherein the holographic optical element includes multiple holograms, which are configured to each focus one of the light radiations from a respective other of the spatial areas presently detected by the particular detection area onto the detector.

4. The LIDAR system as recited in claim 3, wherein at least one of the holograms is a transmission geometry volume hologram.

5. The LIDAR system as recited in claim 1, wherein the illumination unit includes a photoemitter array including multiple photoemitters, which each emit one of the light radiations.

6. The LIDAR system as recited in claim 5, wherein a respective passive optics made up of at least one diffractive optical element and/or a holographic optical element is assigned to individual ones of the photoemitters, the passive optics being configured to split the light radiation emitted by the particular photoemitter in the form of a light beam into at least two subbeams, each illuminating a different spatial area of the observation area.

7. The LIDAR system as recited in claim 1, wherein the detection unit includes multiple detection arrays which are situated spatially offset from one another and are each made up of a respective detector and a respective holographic optical element individually assigned to the detection arrays, detection areas of the detection arrays each covering different spatial areas of the observation area.

8. The LIDAR system as recited in claim 7, wherein the detection arrays of the detection unit are situated in a focal plane of a shared imaging optics.

9. The LIDAR system as recited in claim 1, wherein all spatial areas of the observation area which are presently covered by detectors of the detection unit define a present field of view of the LIDAR system, the LIDAR system being configured to scan the entire observation area using a scanning movement of the present field of view along a predefined scanning direction.

10. The LIDAR system as recited in claim 1, wherein an optical bandpass filter is assigned to at least one of the at least one detection array, which only allows light radiation having certain wavelengths to pass.

11. A holographic imaging optics for a LIDAR system, comprising:
    at least one holographic optical element including multiple holograms, each particular hologram of the holograms being configured to focus a particular light radiation which is individually assigned to the particular hologram, from a respective spatial area which is individually assigned to the particular light radiation onto a detector which is individually assigned to the holographic optical element.

* * * * *